United States Patent Office 3,125,596
Patented Mar. 17, 1964

3,125,596
PROCESS FOR THE PRODUCTION OF α,β-UNSATURATED ACIDS OF THE VITAMIN A SERIES
Hermann Oediger, Cologne-Flittard, and Karl Eiter, Cologne-Stammheim, Germany, assignors to Farbenfabriken Bayer Aktiengesellschaft, Leverkusen, Germany, a corporation of Germany
No Drawing. Filed July 27, 1960, Ser. No. 45,528
Claims priority, application Germany Aug. 9, 1959
6 Claims. (Cl. 260—468)

The object of application Serial No. 859,580, filed December 15, 1959, is a process for the production of α,β-unsaturated acids of the vitamin A series, in which α,β-unsaturated aldehydes or ketones of the vitamin A series are reacted in the presence of alkali metal or alkaline earth metal alkoxides with α-halo fatty acid nitriles, the oxidoimino esters thus obtained treated with acid reagents and from the α-hydroxycarboxylic acid esters obtained in this way either water is split off after hydrolysis or hydrolysis follows splitting off water.

In the further development of the subject matter of the above patent it has surprisingly been found that this process can be most advantageously arranged if for the splitting off of water from the α-hydroxycarboxylic acid esters there are used compounds of the general formula

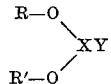

wherein R is an alkyl, cycloalkyl or aryl radical, R' is an alkyl or cycloalkyl radical, X is phosphorus or arsenic and Y is chlorine or bromine, in the presence of tertiary organic bases at elevated temperature.

The α-hydroxy carboxylic acid esters subjected to treatment with a dehydrating agent in accordance with the invention are the α-hydroxy esters disclosed and described in copending application Ser. No. 859,580 and having the formula:

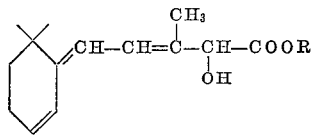

wherein R is an alkyl radical having from one to four carbon atoms. R can be, for example, methyl, ethyl, isopropyl, n-butyl or t-butyl.

In general one proceeds according to the instructions of the above-mentioned patent. The advantage as against this process lies in the fact that by using the hitherto unknown water splitting agents according to the invention, side reactions, i.e. the partially occurring exchange of the hydroxyl groups in the α-hydroxy carboxylic acid esters for halogen, are avoided and the product of the process precipitates so uniformly that an inconvenient purification by chromatography is no longer necessary. The phosphorous-di-ester halides and arsenious acid di-ester halides for the water-splitting according to the invention have not been previously applied for splitting of water from hydroxy compounds. It has only been known that with hydroxyl compounds they react to give tri-esters of phosphorous or arsenious acid. It was therefore not to be foreseen that with these agents the water-splitting could be carried out and in particular that this reaction proceeds in a uniform manner as with the hitherto known water-splitting agents.

As water splitting agents there may be mentioned for example: diethoxy chlorophosphite, propoxy-cyclohexoxy chlorophosphite, dicyclohexoxy chlorophosphite, ethoxy phenoxy chlorophosphite and cyclohexoxy phenoxy chlorophosphite, in every case phosphorus being replaceable by arsenic and, whether in phosphorus or arsenic compounds, the chlorine being replaceable by bromine.

As tertiary bases, N,N-dimethylaniline or quinoline are suitable for example. The reaction can also be carried out in the presence of an inert solvent such as for example cyclohexane, benzene, toluene, xylene or mesitylene.

Expediently 1 mole of the α-hydroxycarboxylic acid ester is reacted with exclusion of moisture in the presence of about 1.3 mols of a suitable base in a solvent at a low temperature, with about 1.1 mols of a water-splitting agent according to the invention and the mixture then heated for some time to a temperature between 80 and 200° C., preferably between 120 and 150° C. Antioxidants can also be added to the mixture and the work carried out with exclusion of air.

The base applied can also be used in a great molar excess calculated on the α-hydroxy carboxylic acid ester. Likewise, a great molar excess of the water-splitting agent does not matter but the α-hydroxy carboxylic acid ester, water-splitting agent and base must stand in such a molar relation that the base in comparison with the water-splitting agent, both calculated on the α-hydroxy carboxylic acid ester, is in greater molar excess than the water-splitting agent.

The working up can follow known methods and is preferably carried out by pouring the mixture into cold dilute mineral acid followed by taking up the organic phase in ether. After purifying the ether phase for removal of excess base, the reaction product is obtained as a residue after evaporating the solvent. It can, if desired, undergo high vacuum distillation.

The products obtained according to the invention represent valuable intermediate products for the synthesis of biologically active substances of the vitamin A series, i.e. vitamin $A_2$ can be obtained from the vitamin $A_2$ acid by reduction with known agents (N. L. Wendler et al., Journal of the American Chemical Society 73 719 (1951)).

The following examples are given for the purpose of illustrating the invention.

*Example 1*

105.6 parts by weight of 5-(2',6',6'-trimethylcyclohexene-(2')-ylidene) - 3 - methyl - 2 - hydroxy-pentene-(3)-acid methyl ester-(1) are dissolved together with 63 parts by weight of N,N-dimethylaniline in 300 parts by volume of anhydrous xylene. A solution of 68.8 parts by weight of di-ethoxychloro phosphite in 100 parts by volume of anhydrous xylene are added to the mixture dropwise with exclusion of air and moisture and with stirring at 5° C. followed by heating for 1 hour under reflux. The cooled reaction solution obtained is poured into a mixture of 3 N sulfuric acid and ice. The organic phase is separated with an addition of ether, extracted with dilute sulfuric acid for removal of excess N,N-dimethylaniline, washed neutral with water and dried over anhydrous sodium sulfate. After evaporating the solvent there remains the crude 5-(2',6',6'-trimethyl cyclohexadiene-(1',3')-yl)-3-methylpentadiene-(2,4) acid methyl ester-(1), which is purified by evaporation from a thin layer at 0.002 mm. mercury. 67 parts by weight (68% of the theoretical) of a yellow oil are obtained. $\lambda_{max}$ =345mμ, 260 mμ (ε=16.000 or 11.000). Calculated: 78.01% C, 9.00% H. Found: 78.00% C, 8.90% H.

*Example 2*

7.9 parts by weight of 5-(2',6',6'-trimethylcyclohexene-(2')-ylidene - 3 - methyl - 2 - hydroxy-pentene-(3)-acid methyl ester-(1) are dissolved together with 7.25 parts by weight of N,N-dimethylaniline in 30 parts by volume of anhydrous xylene. A solution of 6.64 parts by weight of di-propoxychlorophosphite in 20 parts by volume of anhydrous xylene are added to the mixture with exclusion of air and moisture with stirring at 5° C. during 10 minutes followed by heating for half an hour under reflux. The cooled reaction solution obtained is poured into a mixture of 3 N sulfuric acid and ice. The organic phase is separated with an addition of ether, extracted with diluted sulfuric acid for removal of excess N,N-dimethylaniline, washed neutral with water and dried over anhydrous sodium sulfate. After evaporating the solvent there remains the crude 5-(2',6',6'-trimethylcyclohexadiene-(1',3')-yl-3-methyl - pentadiene - (2,4) acid methyl ester-(1), which is purified by fractional distillation. 5.5 parts by weight (74% of the theoretical) of a yellow oil are obtained. B.P.$_{0.001}$ 100–110° C.

The physical properties of the product tally completely with those reported on in Example 1.

*Example 3*

Following the method reported on in Example 2 from 7.9 parts by weight of 5-(2',6',6'-trimethyl cyclohexene-(2')-ylidene) - 3 - methyl - 2 - hydroxy-pentene-(3) acid methyl ester-(1), 7.25 parts by weight of N,N-dimethylaniline and 7.65 parts by weight of di-butoxychloro phosphite 5.2 parts by weight (70% of the theoretical) of 5-(2',6',6'-trimethylcyclohexadiene - (1',3') - yl - 3 - methylpentadiene-(2,4)- acid methyl ester-(1) are obtained; it has the physical properties reported on in Example 1.

*Example 4*

Following the method reported on in Example 2, but replacing the di-butoxychlorophosphite by 8.7 parts by weight of di-cyclohexoxychlorophosphite, 4.77 parts by weight (65% of the theoretical) of the product reported on in Examples 1 to 3 are obtained.

We claim:
1. Process for the production of α,β-unsaturated acid esters of the formula

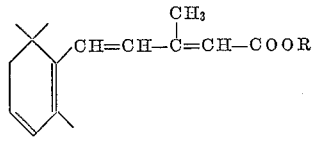

wherein R is an alkyl radical of 1 to 4 carbon atoms, which comprises splitting off water from an α-hydroxy carboxylic acid ester of the formula

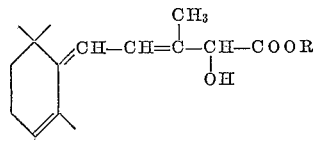

wherein R is as above defined by treating said ester with a water splitting compound of the formula

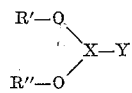

wherein R' is selected from the group consisting of alkyl radicals having up to five carbon atoms, cyclohexyl and phenyl, R" is selected from the group consisting of alkyl radicals having up to five carbon atoms and cyclohexyl, X is selected from the group consisting of phosphorus and arsenic, and Y is selected from the group consisting of chlorine and bromine in the presence of an organic tertiary base selected from the group consisting of quinoline and dimethylaniline, at a temperature between 80° and 200° C., and recovering resulting α,β-unsaturated acid ester.

2. Process according to claim 1, wherein said splitting-off of water is effected using 1 mol of said α-hydroxy carboxylic acid ester, 1.1 mols of said water-splitting compound, and 1.3 mols of said organic tertiary base.

3. Process for the production of 5-(2',6',6'-trimethyl cyclohexadiene-(1',3')-yl) - 3 - methyl-pentadiene-(2,4) acid methyl ester-(1), which comprises splitting-off water from 5-(2',6',6'-trimethyl cyclohexene-(2')-ylidene)-3-methyl-2-hydroxy-pentene-(3)-acid methyl ester-(1) by treating said ester compound with diethoxychloro phosphite in the presence of N,N-dimethylaniline.

4. Process for the production of 5-(2',6',6'-trimethyl cyclohexadiene - (1',3') - yl - 3 - methyl - pentadiene - (2,4) acid methyl ester-(1), which comprises splitting-off water from 5-(2',6',6' - trimethyl cyclohexene - (2')-ylidene-3-methyl-2-hydroxy-pentene-(3)-acid methyl ester-(1) by treating said ester compound with di-propoxychloro phosphite in the presence of N,N-dimethylaniline.

5. Process for the production of 5-(2',6',6'-trimethyl cyclohexadiene - (1',3') - yl - 3 - methyl-pentadiene-(2,4) acid methyl ester-(1), which comprises splitting-off water from 5-(2',6',6'-trimethyl cyclohexene-(2')-ylidene)-3-methyl-2-hydroxy-pentene-(3) acid methyl ester-(1), by treating said ester compound with di-butoxychloro phosphite in the presence of N,N-dimethylaniline.

6. Process for the production of 5-(2',6',6'-trimethyl cyclo-hexadiene-(1',3') - yl - 3 - methyl-pentadiene-(2,4) acid methyl ester-(1), which comprises splitting-off water from 5-(2',6',6'-trimethyl cyclohexene-(2')-ylidene)-3-methyl-2-hydroxy-pentene-(3) acid methyl ester-(1), by treating said ester compound with di-cyclohexoxychloro phosphite in the presence of N,N-dimethylaniline.

References Cited in the file of this patent
UNITED STATES PATENTS

| 2,576,103 | Cawley et al. | Nov. 27, 1951 |
| 2,709,712 | Cawley et al. | May 31, 1955 |